United States Patent
Li (10) Patent No.: US 9,335,837 B2
(45) Date of Patent: May 10, 2016

(54) TEXT FLOW SENSITIVE BACKSPACE KEY FOR BI-DIRECTIONAL CONTENT

(75) Inventor: Rui Li, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 492 days.

(21) Appl. No.: 13/316,452

(22) Filed: Dec. 9, 2011

(65) Prior Publication Data

US 2013/0147707 A1 Jun. 13, 2013

(51) Int. Cl.
*G06F 3/033* (2013.01)
*G06F 3/023* (2006.01)
*G06F 3/0489* (2013.01)

(52) U.S. Cl.
CPC ............. *G06F 3/033* (2013.01); *G06F 3/023* (2013.01); *G06F 3/04892* (2013.01)

(58) Field of Classification Search
USPC ....... 345/168, 581; 382/309; 704/4; 715/256, 715/262, 264, 273, 809, 857; 717/117
See application file for complete search history.

(56) References Cited

U.S. PATENT DOCUMENTS

| | | | |
|---|---|---|---|
| 5,916,310 A | 6/1999 | McCain | |
| 7,073,138 B2* | 7/2006 | Mirkin | G06F 17/24 715/256 |
| 2003/0206122 A1 | 11/2003 | Emerson | |
| 2008/0015841 A1 | 1/2008 | Longe et al. | |
| 2008/0316183 A1 | 12/2008 | Westerman et al. | |
| 2013/0080963 A1* | 3/2013 | Hong | G06F 3/04886 715/773 |

OTHER PUBLICATIONS

Backspace, http://en.wikipedia.org/w/index.php?title=Backspace &oldid=168920711 (revision Nov. 3, 2007).*
"Administrator's Guide and Reference: Bidirectional Language Support (Arabic and Hebrew)", Retrieved on: Oct. 4, 2011, Available at: http://publib.boulder.ibm.com/infocenter/pcomhelp/v5r9/index. jsp?topic=/com.ibm.pcomm.doc/books/html/admin_guide26.htm.
"Keyboard Design", Retrieved on: Oct. 4, 2011, Available at: http://wiki.laptop.org/go/Keyboard_design.
"Keyboard's Delete Button—Can I Reverse its Direction?", Retrieved on: Oct. 4, 2011, Available at: http://hintsforums.macworld.com/showthread.php?t=94041.
(Continued)

*Primary Examiner* — Kathy Wang-Hurst
*Assistant Examiner* — Douglas Wilson
(74) *Attorney, Agent, or Firm* — Judy Yee; Micky Minhas (57) ABSTRACT

Systems, methods and computer program products for providing a text sensitive backspace key for bi-directional content are disclosed. Such systems, methods and computer program products provide a multi-stage text flow identification approach that combines desirable aspects of tracking a chronological position of typed characters as well as a cursor within bi-directional content. A directional orientation of a backspace key is thereafter manipulated on a keyboard that is both reliable and intuitive for users of a computing system. Thus, when a last-typed character, chronologically positioned immediately before the cursor, is a left-to-right (LTR) character (e.g., English language text), the backspace key is displayed in a first direction. When the last-typed character is a right-to-left (RTL) character (e.g., Hebrew language text), the backspace key is displayed in a second direction. Advantageously, the user visually learns which character will be deleted when the backspace key is pressed on the keyboard.

19 Claims, 6 Drawing Sheets

(56) References Cited

OTHER PUBLICATIONS

"New Gadgets Latest Cell Phones—Palm Pre Receives a Virtual Keyboard—Newest Cell Phones, Mobile Cell Phone Reviews, Cool Gadgets", Retrieved on: Oct. 4, 2011, Available at: http://sclick.net/new-gadgets-2/new-gadgets-latest-cell-phones-palm-pre-receives-a-virtual-keyboard-newest-cell-phones-mobile-cell-phone-reviews-cool-gadgets.html.

"About Yamli", Retrieved on: Oct. 4, 2011, Available at: http://www.yamli.com/about/.

\* cited by examiner

TEXT FLOW SENSITIVE BACKSPACE KEY FOR BI-DIRECTIONAL CONTENT

FIELD OF THE DISCLOSURE

The present disclosure generally relates to computer graphical user interfaces and more particularly to systems, methods and computer program products for providing a text flow sensitive backspace key for bi-directional content while interacting with a computing system.

BACKGROUND

In today's technological environment, it is common for people to interact with their computing devices—such as mobile telephones, laptops, tablet computers, personal digital assistants (PDAs) and the like—via a software keyboard displayed on a screen. That is, selection of the software keyboard images may be done using a touch screen. The user may tap the desired software keyboard images or may use a stylus to select the software keyboard images. In other cases, a mouse cursor may be positioned over the desired software keyboard images and those images may be clicked to enter the desired alphanumeric character.

With the popularity of such software keyboards, multilingual-based computing as a means for interacting with computer devices has begun to proliferate, ushering in a new era of user interface design. Such proliferation includes user interface designs for software keyboards that create and edit right-to-left (RTL) content (e.g., Hebrew or Arabic language text) and left-to-right (LTR) content (e.g., English language text). Using a backspace key to delete a character in only LRT content or only RTL content is straight forward because the visually displayed position of a cursor immediately trails/follows the last-typed character. For example, with LTR content, the cursor is positioned to the immediate right of the last-typed character, whereas, for RTL content, the cursor is positioned to the immediate left of the last-typed character. Thus, a user is able to easily understand which character will be deleted upon pressing the backspace key.

In some cases, LTR and RTL content may be simultaneously displayed on a screen wherein the cursor is located at the edge of the RTL and LTR content. Such multilingual content is often referred to as "bi-directional content." Recognizing bi-directional—as opposed to unidirectional—content and visually disambiguating LTR characters from RTL characters is difficult. For example, some languages, such as Arabic, Hebrew, Farsi and Yiddish characters are written in a RTL manner. Conversely, in the English language (as well as most languages in the world) characters are written in a LTR manner. Because of the predefined appearance of a software keyboard graphical user interface (GUI), the backspaced key may always point to either the left or the right. However, when an input cursor is placed at the edge of RTL and LTR content and a user desires to delete such bi-directional content, the user does not know which character will be deleted and will sometimes delete a character they do not want to delete. It could be either the last character of the LTR content, or the last character of RTL content. Even in some RTL languages (e.g., Arabic and Hebrew), numbers are still written in a LTR manner. Thus, bi-directional content is inevitable even for single-language, RTL users.

Given the foregoing, what are needed are systems, methods and computer program products for providing a text flow sensitive backspace key for bi-directional content while interacting with a computing system.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present disclosure meets the above-identified needs by providing systems, methods and computer program products for providing a text flow sensitive backspace key for bi-directional content while interacting with a computing system.

In an embodiment, the present disclosure provides systems, methods and computer program products that provide a text flow sensitive backspace key for bi-directional content while interacting with a computing system using a multi-stage approach—a first text flow identification component followed by a second software keyboard manipulation (modification) component. That is, to begin text flow identification, a user moves a cursor into bi-directional content displayed on a GUI screen wherein the last character immediately preceding the cursor position is identified as either a LTR character or a RTL character. Second, to visually notify the user of the backspace key operating direction, surface indicia on the backspace key is automatically toggled (i.e., manipulated/modified) to either a left direction for LTR text flow or in a right direction for RTL text flow. In this manner, the user quickly learns that a left-pointing backspace key will delete the character to the left of the cursor, while a right-pointing backspace key will delete the character to the right of the cursor.

In an exemplary embodiment, unlike existing software keyboard modification techniques, a combination of text flow identification and software keyboard manipulation based parameters is used to identify LTR and RTL characters in a bi-directional content environment. The orientation (i.e., appearance) of the backspace key on the software keyboard is automatically toggled to the direction that the bi-directional content will be deleted upon pressing/tapping/clicking the backspace key. Users are able to create and edit LTR and RTL content with certainty, wherein the GUI of the executing application properly points the arrow label (surface indicia) on the backspace key of the software keyboard. Such automatic modification of the software keyboard demonstrates which LTR or RTL character will be deleted based the location of the cursor in the bi-directional content.

In yet another embodiment, the systems, methods and computer program products of the present disclosure use edit control to manage the logic storage in a memory of the computing device and thereby determine whether the last character before the cursor position is LTR content or RTL content.

In yet another embodiment of the present disclosure, the systems, methods and computer program products of the present disclosure use edit control to automatically toggle the backspace key arrow towards the left direction (for LTR content) or the right direction (for RTL content).

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

The present disclosure is directed to systems, methods and computer program products that facilitate a text flow sensitive backspace key modification process for bi-directional content.

In various embodiments, such systems, methods and computer program products provide a multi-stage text flow identification approach that combines desirable aspects of bi-directional content determination and backspace key modification in order to provide a software keyboard that is both reliable and intuitive for users of a computing system. In a first text flow identification stage, a user moves a cursor into content displayed on a screen—which, in alternate embodiments, may be a physical space in front of the user's body or a region of the onscreen GUI. If the content contains bi-directional characters, the last character immediately preceding the cursor position is identified as either a LTR character or a RTL character. Second, in a software keyboard manipulation stage, surface indicia on the backspace key (which may be displayed as an arrow label or other symbol) is automatically toggled to either a left direction for LTR text flow or in a right direction for RTL text flow. In this manner, the user quickly learns that a left-pointing backspace key will delete the last character to the left of the cursor, while a right-pointing backspace key will delete the last character to the right of the cursor.

The present invention is now described in more detail herein in terms of the above exemplary contexts involving a software keyboard. This is for convenience only and is not intended to limit the application of the present invention. In fact, after reading the following description, it will be apparent to those skilled in the relevant art(s) how to implement the invention in alternative aspects. For example, the systems, methods and computer program products of the disclosure may be also implemented in a more traditional hardware keyboard having the ability alter the label on the keys. That is, the present invention may be implemented using a hardware keyboard which uses, for example, one or more background lights to illuminate the labels on the individual keys of the keyboard (i.e., using such background illumination to alter the arrow label of the backspace key in a plurality of directions based on cursor position within bi-directional content).

Figure 1:
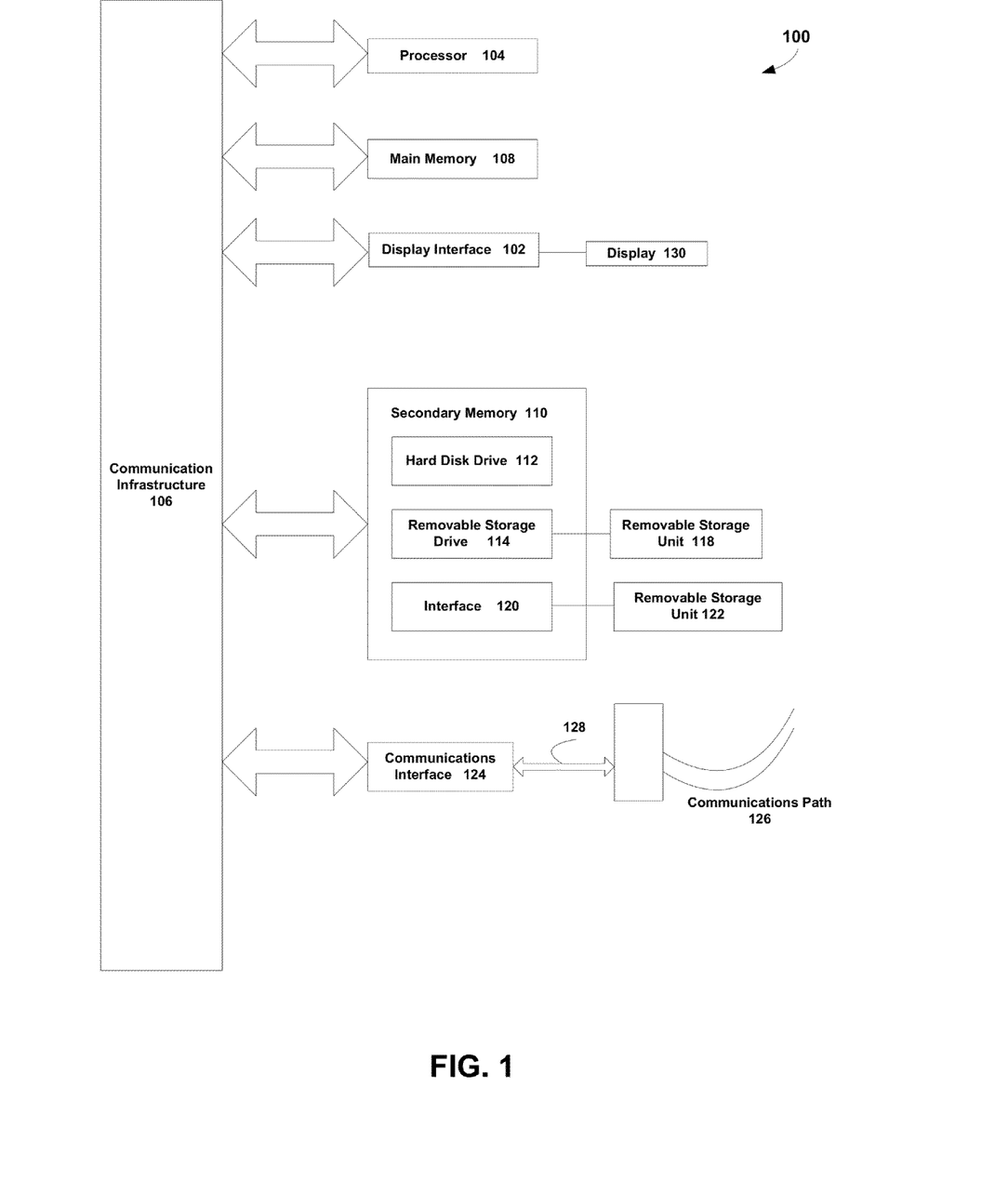
FIG. 1 is a block diagram of an exemplary computer system useful for implementing exemplary embodiment(s) of the present disclosure.

In one embodiment, the disclosure is directed toward one or more computer systems capable of carrying out the functionality described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the disclosure using other computer systems and/or architectures.

Computer system 100 can include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The disclosure is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present disclosure, as discussed herein. In particular, the computer programs, when executed, enable the processor 104 to perform the features of the present disclosure. Accordingly, such computer programs represent controllers of the computer system 100.

In an embodiment where the disclosure is implemented using software, the software may be stored in a computer program product and loaded into computer system 100 using removable storage drive 114, hard drive 112 or communications interface 124. The control logic (software), when executed by the processor 104, causes the processor 104 to perform the functions of the disclosure as described herein.

In another embodiment, the disclosure is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a game console, a portable media player, a desktop, a laptop, a server, a tablet computer, a PDA, a mobile computer, a smart telephone, a mobile telephone, an intelligent communications device or the like.

In yet another embodiment, the disclosure is implemented using a combination of both hardware and software.

Figure 2:
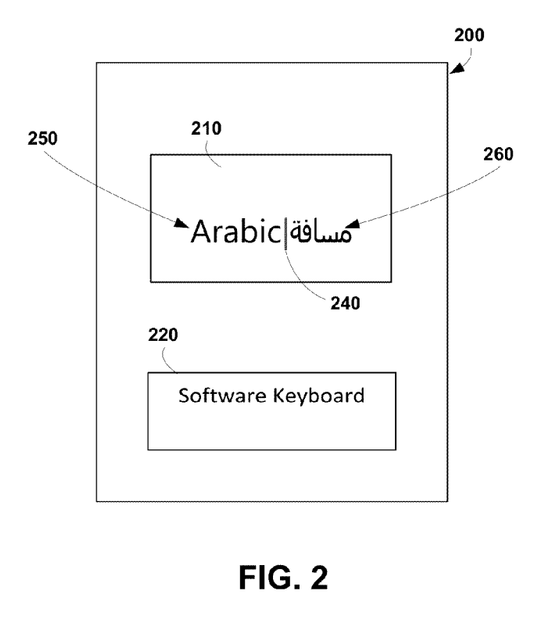
FIG. 2 is a screen shot illustrating an exemplary visual appearance of bi-directional content displayed on a display screen wherein a cursor is positioned at the edge of LTR content and RTL content.
Figure 3:
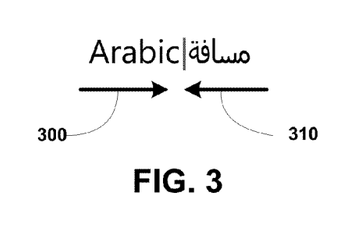
FIG. 3 is a block diagram illustrating an exemplary computing device memory that stores a chronological order of the bi-directional content illustrated in FIG. 2 as each character is touched on a software keyboard, wherein the cursor is positioned immediately after a LTR character, according to an embodiment of the present disclosure.

Referring to FIG. 2, a screen shot illustrating an exemplary graphical user interface (GUI) screen 200 displaying a visual appearance of bi-directional content 210 of a word processor, email reader, text messenger or other (productivity) application, according to an embodiment of the present disclosure, is shown. A cursor 240 is positioned at an edge of (between) LTR content 250 and RTL content 260 on the GUI screen 200. In this example, LTR content 250 visually displays LTR characters spelling the word "Arabic". (As shown in FIG. 3, the typed chronological order of the LTR characters is identified by the corresponding LTR-pointing arrow 300 located subjacent thereto.) The cursor 240 is located immediately after the LTR character "c". Immediately following the cursor 240, RTL content 260 displays RTL characters spelling the same word, but in the RTL Arabic language. (As shown in FIG. 3, the typed chronological order of such RTL characters is identified by the corresponding RTL-pointing arrow 310 located subjacent thereto.) Such respective chronological orders of typed LTR and RTL characters may be tracked by logic storage in the memory of computing device 100, as explained herein below.

As will be appreciated by those skilled in the relevant art(s) after reading the description herein, GUI screen 200 may occur on computer system 100 as part of an executing computer program (software) application wherein a software keyboard 220 interaction is supported (e.g., a video game, an e-learning application, a media player application, a word processing application, a media application, a text messaging application or other productivity application, an operating system, etc.). The software keyboard 220 may be displayed beneath the bi-directional content 210 as part of the same GUI screen 200 or, for example, may be displayed on a separate GUI screen. That is, bi-directional content 210 and software keyboard 220 may be simultaneously displayed in the same GUI screen 200 or in separate GUI screens (when different applications simultaneously run on computing device 100), as well known by those skilled in the relevant art(s).

GUI screen 200 may be produced by a computer program (software) application, executing on computing device 100, wherein bi-directional content 210 (bi-directional text flow) and software keyboard 220 are supported. In such embodiments, software keyboard 220 is communicatively linked to bi-directional content 210 for creating and editing bi-directional content 210. First, to begin bi-directional text flow identification, the user moves cursor 240 into bi-directional content 210 displayed on screen 200 of the application executing on computing device 100. The presence of cursor 240 within bi-directional content 210 instructs computing device 100 to learn the typed chronological order of each visually displayed character contained therein. That is, the last-typed character located before cursor 240 is identified and distinguished from the remaining typed characters in the bi-directional content 210. To move cursor 240, the user may need to activate (i.e., blink) cursor 240 within screen 200 by, for example, tapping a portion of software keyboard 220, bi-directional content 210 or screen 200. As will be appreciated by those skilled in the relevant art(s) after reading the description herein, bi-directional content 210 may be completely displayed on a single row or wrapped about multiple rows within screen 200. The bi-directional content 210 may be within a field of view of screen 200 located on device 100 (e.g., in an embodiment where device 100 is a Windows® Phone, equipped with an email reader application, word processor application, text messenger application or like productivity application(s) available from Microsoft Corporation of Redmond Wash., or a laptop or tablet computer equipped with a productivity application). This allows use of multiple applications that accept a range of bi-directional content 210 created/edited via a single software keyboard 220. Of course, each application may have a dedicated software keyboard, for example.

Figure 6A:
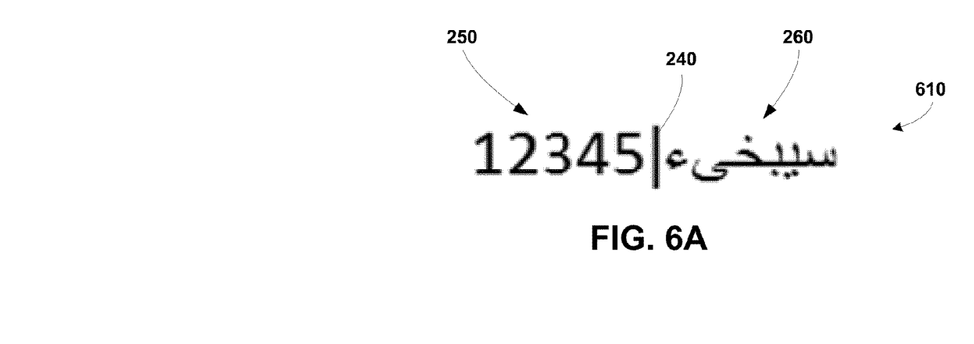
FIGS. 6A-C are screenshots illustrating exemplary graphical user interface (GUI) windows employing the text flow backspace key modification process for bi-directional content, according to various embodiments of the present disclosure.
Figure 6B:
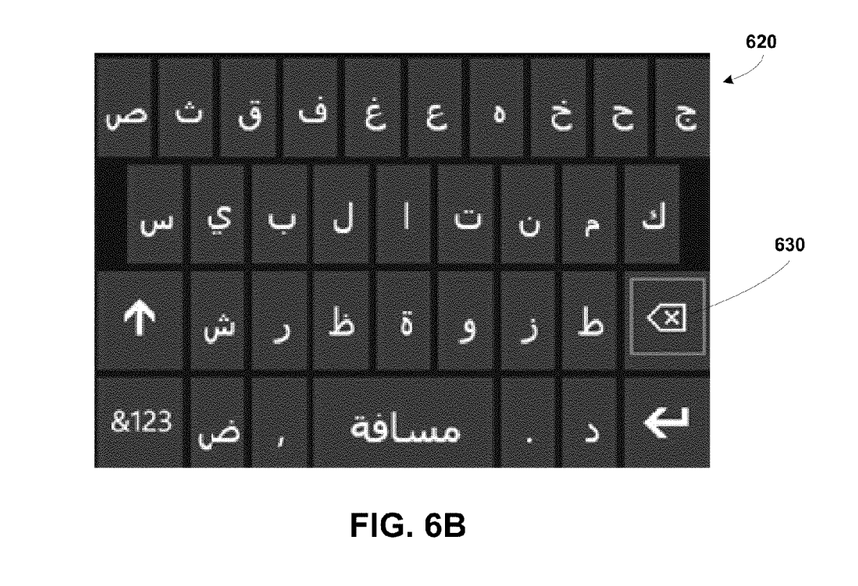
Figure 6C:
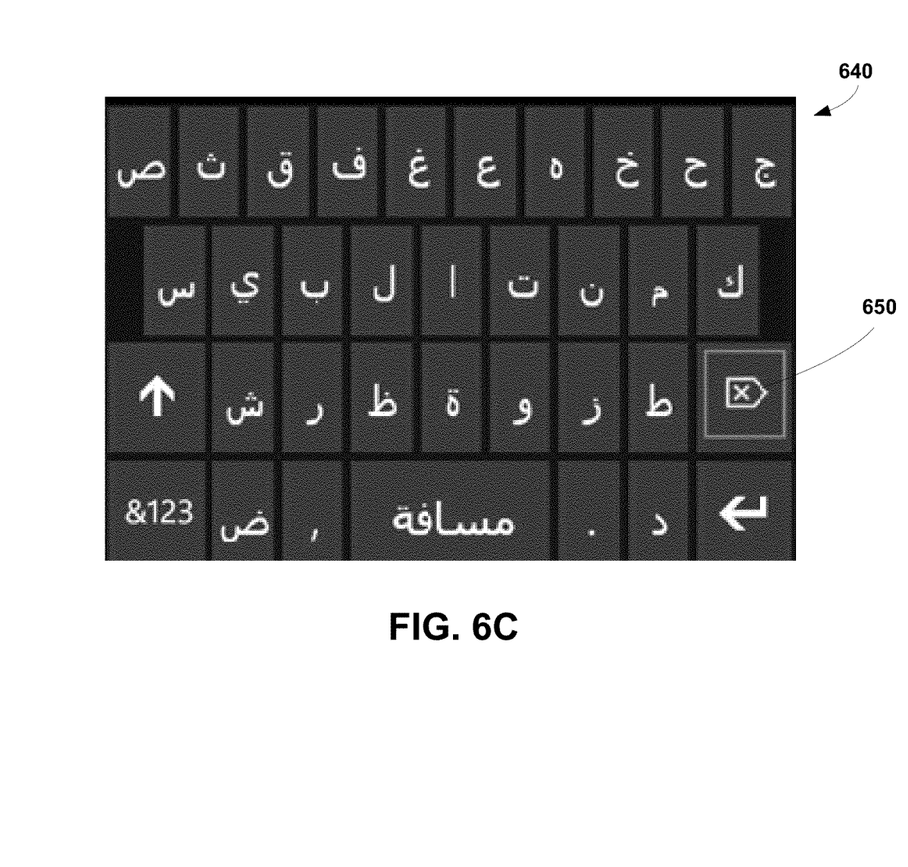

As illustrated in FIG. 2, the visual appearance of bi-directional content 210 on screen 200 fails to clarify which character will be deleted upon pressing backspace key 630, 640 (as shown in FIGS. 6B-C) on software keyboard 220. Such ambiguity exists because the user may not know if the last-typed character belongs to LTR content 250 or RTL content 260. For example, if English content (LTR content 250) was typed after Arabic content (RTL content 260), the last LTR character "c" would be deleted. However, if Arabic content was typed after English content, the last RTL character """ٽ"" would be deleted. Advantageously, the chronological typed order of bi-directional content 210 (combination of LTR content 250 and RTL content 260) is tracked to learn the operating direction of the backspace key on software keyboard 220.

Figure 4A:
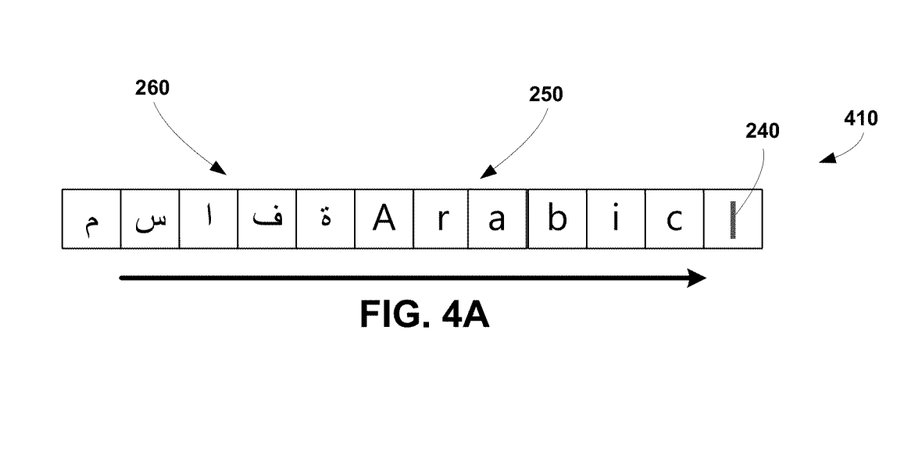
FIGS. 4A-B are block diagrams illustrating an exemplary computing device memory that stores a chronological order of bi-directional content according to an embodiment of the present disclosure.
Figure 4B:
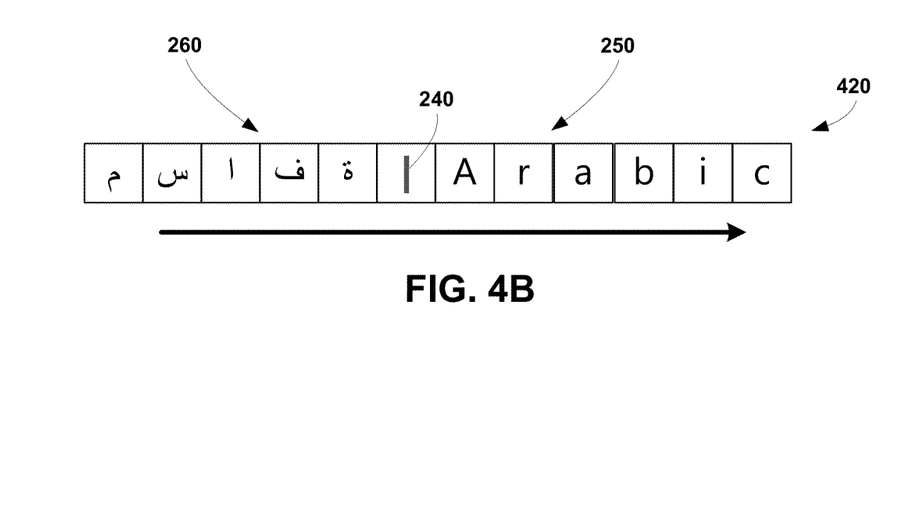

Referring now to FIGS. 4A and 4B, block diagrams illustrating exemplary computing device memory 410 and 420, respectively, which stores a chronological order of bi-directional content, according to an embodiment of the present disclosure, are shown. That is, in such embodiment, as each character of bi-directional content 210 is touched on software keyboard 220, edit control manages logic storage 410 and 420 in the memory of computing device 100. Such edit control may be embodied as a control window (not shown) typically used in a dialog box (not shown) to enable the user to enter and edit text. Exemplary edit control(s) support both a Unicode character set in which characters are two bytes, and ANSI character sets in which characters are one byte, as well known by those skilled in the relevant art(s).

Referring to FIG. 4A in particular, as will be appreciated by those skilled in the relevant art(s) after reading the description herein, a block diagram of exemplary logic storage 410 in the memory of an exemplary computing device 100 is illustrated wherein logic storage 410 chronologically tracks each typed character in bi-directional content 210. Such bi-directional content 210 is visually displayed on the screen 200. In particular, each typed character is stored in the chronological order in which its respective key image is engaged on software keyboard 220. As noted above in FIG. 3, LTR-pointing arrow 300 and RTL-pointing arrow 310 identify the chronological order of LTR 250 and RTL 260 content, respectively, as they are entered via software keyboard 220. FIG. 4A illustrates the position of cursor 240 located immediately after LTR character, "c", which corresponds to the position of cursor 240 visually appearing in bi-direction content 210 displayed on screen 200. In such an example, logic storage 410 identifies letter "c" as the last chronologically typed character, which is a LTR character in LTR content 250. Therefore, surface indicia (e.g., an arrow label) on backspaced key 630 of software keyboard 620 will point in the left direction as shown in FIG. 6B. Such visual display on software keyboard 620 visually notifies the user that pressing backspace key 630 will delete the last-typed character to the immediate left of cursor 240.

Referring to FIG. 4B in particular, as will be appreciated by those skilled in the relevant art(s) after reading the description herein, a block diagram of exemplary logic storage 420 in a memory of an exemplary computing device 100 is illustrated wherein a chronological order of typed LTR 250 and RTL 260 content is tracked along with a position of cursor 240. In this example, cursor 240 is located immediately after RTL character ""ة"", which corresponds with the visual appearance of cursor 240 in bi-directional content 210. In this example, however, backspace key 650 will operate in the right direction and delete the RTL character ""ة"" because logic storage 420 in memory identifies RTL character ""ة"" as the last chronologically typed character before cursor 240. Therefore, surface indicia (e.g., an arrow label) on backspace key 650 of software keyboard 640 will point in the right direction as shown in FIG. 6C. Such visual display of software keyboard 640 effectively notifies the user that pressing backspace key 650 will delete the last-typed character to the immediate right of cursor 240.

In the software keyboard manipulation stage, the arrow label (surface indicia) on the backspace key is automatically toggled between left and right directions (or other appropriate directions according to the bi-direction content flow), when the last chronological typed character positioned before the cursor is identified as a LTR character or a RTL character, respectively. If the cursor 240 position is logically stored immediately after the last LTR character 250, this may mean that an English word was typed after an Arabic word, as shown in FIG. 4A. Conversely, if the cursor 240 position is logically stored immediately after the last RTL character 260, this may mean that an Arabic word was typed after an English word, as shown in FIG. 4B. That is, FIG. 4A illustrates an exemplary case wherein the English term was typed last and FIG. 4B illustrates an exemplary case wherein the Arabic term was typed last. Thus, in non-limiting exemplary embodiments, software keyboard 620, 640 is modified wherein backspace key 630, 650 surface indicia is automatically toggled to either left or right directions, respectively. Such software keyboard modification (manipulation) visually notifies the user that edit control has detected bi-directional content 210 on screen 200, and the directional operation of backspace key 630, 650 has been altered.

Figure 5:
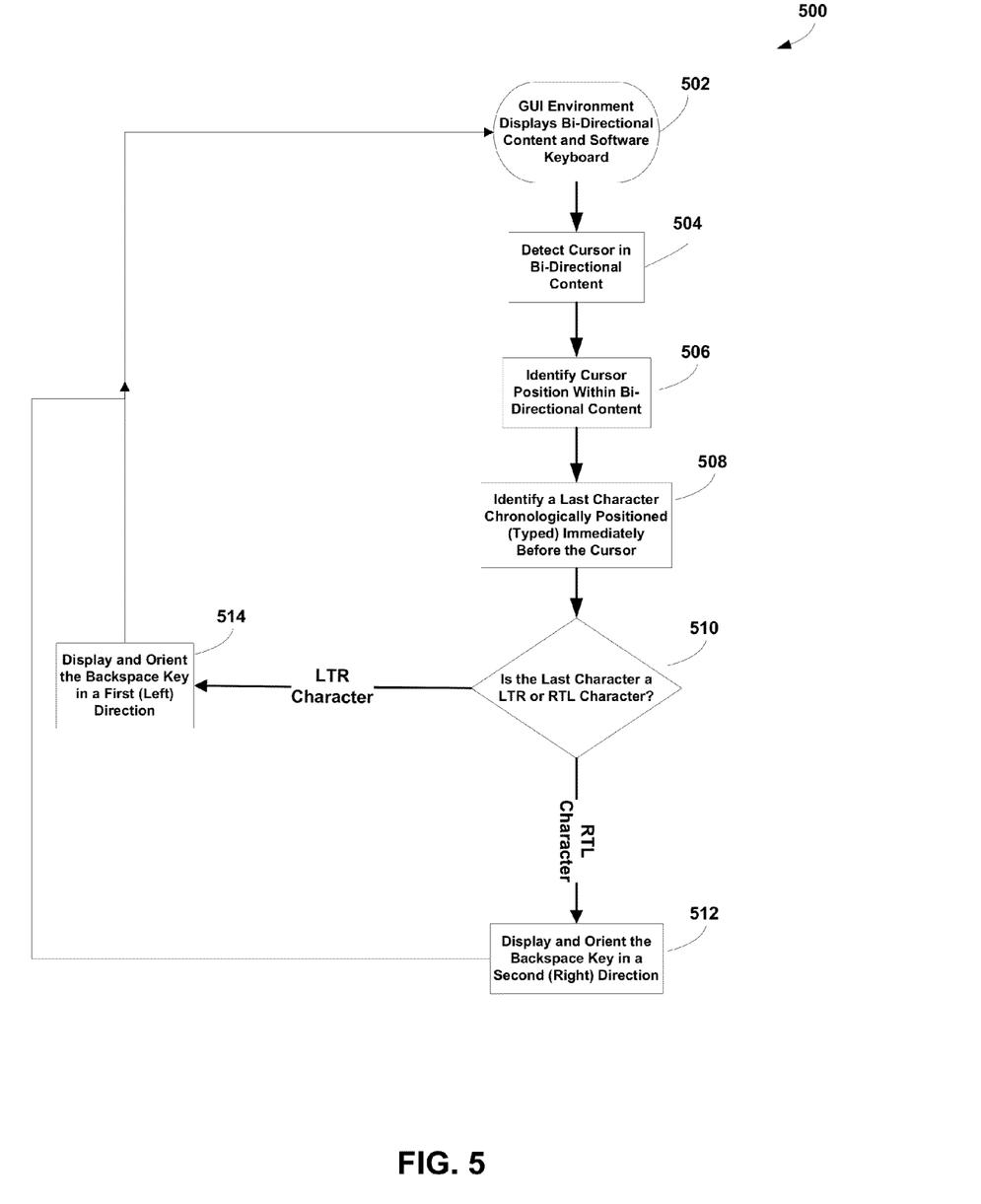
FIG. 5 is a flowchart illustrating an exemplary multi-stage text flow backspace key modification process for bi-directional content, according to an embodiment of the present disclosure.

Referring now to FIG. 5, a flowchart illustrating an exemplary text flow identification and software keyboard manipulation (modification) process 500, according to an embodiment of the present disclosure, is shown.

Process 500, which would execute on computer system 100, begins at step 502 after a program application is launched and its associated GUI screen 200 visually displays bi-directional content 210 on one portion of screen 200 and a software keyboard 220 on another portion of screen 200 (as shown in FIG. 2). That is, an on-screen software keyboard GUI 620, 640 may be displayed, as shown in FIGS. 6B-C. The software keyboard GUI 620, 640 images may include a plurality of user selectable character key images to facilitate character entry. The user may select key images by touching those images in the case of a touch screen with their finger or a stylus. In other cases, a mouse cursor may be positioned over the key image and the image may be selected using a mouse click operation. Control would then pass to step 504.

In step 504, when the user moves and/or places cursor 240 into bi-directional content 210 displayed on screen 200 of an application executing on computing device 100, a visual cue indicates that a text creating/editing interaction is possible. For example, cursor 240 may be positioned at any portion of bi-directional content 210, or adjacent thereto, and may visually "blink" or otherwise be visually identifiable on the screen. (See, e.g., FIGS. 2, 3 and 6A.) Alternatively, a pointer or similar indicator may be used. In this way, additional help is provided for new users who hover over bi-directional content, but are unsure whether it is permissible to position cursor 240 at an edge of LTR 250 and RTL 260 characters in bi-directional content 210.

In step 506, a position of cursor 240 is identified within the bi-directional content 210. For example, logic storage 410, 420 of the computing device memory chronologically tracks each character 250, 260 of bi-directional content 210 in the order typed on screen 200 and thereafter locates the cursor 240 position within bi-directional content 210.

Thus, in step 508, edit control manages logic storage 410, 420 and identifies the last-typed character within bi-directional content 210 (250, 260), positioned immediately before cursor 240. This may be performed by identifying the last-typed character chronologically located immediately to the left of cursor 240 in logic storage 410, 420. Such a chronological location in logic storage 410, 420 corresponds to the chronological order in which the last character was typed on screen 200 relative to the position of cursor 240.

Next, in step 510, edit control determines whether the last-typed character before the cursor 240 position is a LTR character 250 or a RTL character 260. This step may be performed by looking up the last-typed character in a table or like comparison database, for example, which contains Unicode character recognition protocol(s). As will be apparent to those skilled in the relevant art(s), various techniques may be used to determine characters are LTR 250 or RTL 260 characters within bi-directional content 210 without departing from the true spirit and scope of the present disclosure.

Then, in steps 512, 514, the backspace key 630, 650 (which may contain a corresponding arrow label or similar surface indicia) is automatically toggled in a left direction or a right direction on software keyboard GUI 620, 650, respectively. In particular, when the last character in the bi-directional content 210 is determined to be a LTR character 250, backspace key 630 is displayed and oriented in a first (left) direction on software keyboard 620 of the application executing on a computing device 100. Alternately, when the last character in bi-directional content 210 is a RTL character 260, the backspace key 650 is displayed and oriented in a second (right) direction on software keyboard 640 of the application executing on computing device 100.

As will be appreciated by those skilled in the relevant art(s) after reading the description herein, software keyboard 220 may run on either that same application as a productivity application or a separate dedicated application. In this manner, software keyboard 220 may be displayed via a separate GUI or via the same GUI as the productivity application, without departing from the true spirit and scope of the present disclosure.

As will be appreciated by those skilled in the relevant art(s) after reading the description herein, in alternate embodiments, the first and second directions of steps 512, 514 of process 500 may be top and bottom rather than right and left. This would allow program applications launched on device 100 and their associated GUI screens 200 to properly handle backspace operations for top-to-bottom language content such as Japanese and Chinese text characters.

In an embodiment, computing device 100 may be a mobile telephone including edit control and memory communicatively coupled thereto wherein the chronological typed order of each character within the bi-directional content 210 is stored in memory and managed by edit control such that edit control performs the step of determining whether the last chronologically typed character is a LTR character 250 or RTL character 260, immediately before the cursor 240 position.

Referring again to FIG. 6A, a screen shot illustrates an exemplary graphical user interface environment displaying a visual appearance of bi-directional content 610 on a screen 200 associated with a word processor, email reader, text messenger or like productivity applications executing on computing device 100. Cursor 240 is positioned between LTR content 250 and RTL content 260. In this example, LTR content 250 visually displays a sequence of LTR characters, "12345". Cursor 240 visually appears immediately after the LTR character "5". Immediately following cursor 240, RTL content 260 visually displays Arabic RTL text characters. Thus, the visual appearance of cursor 240 is at an edge between LTR 250 and RTL 260 content. Such an exemplary scenario renders it difficult to understand the operating direction of a backspace key.

Referring again to FIGS. 6B-C, screenshots 620, 640 illustrating exemplary GUI windows employing software keyboard manipulation process, according to various embodiments of the present disclosure, are shown. (As will be appreciated by those skilled in the relevant art(s) after reading the description herein, screenshots 620, 640 represent different states of the GUI screen while process 500 executes on computer system 100.) As noted hereinabove, backspace key 630, 650 of software keyboard GUI 620, 640 will always delete the last chronologically-typed character before the cursor position tracked in the logic storage of computing device 100.

If cursor 240 is positioned behind a last-typed LTR character, the backspace key 630 will delete LTR character "5". In this manner, the arrow label (surface indicia) on backspace key 630 will point to the left as shown in FIG. 6B, indicating that the LTR character to the left of the cursor will be deleted. If the cursor is positioned behind the RTL character, the backspace key will delete RTL character " "ؤ" ". In this manner, the arrow label (surface indicia) on the backspace key will point to the right as shown in FIG. 6C, indicating that the RTL character to the right of the cursor will be deleted.

In an embodiment, bi-directional content 210 may include both a LTR character 250 and a RTL character 260 displayed side-by-side on screen 200 without any space there between.

In an embodiment, RTL character 260 and LTR character 250 may be displayed in different languages.

In an embodiment, bi-directional content 210 may include top-to-bottom characters (TTB) and bottom-to-top (BTT) characters vertically oriented at an end-to-end pattern.

In an embodiment, a first backspace key direction may point to an up direction on software keyboard 220, and a second backspace key direction may point to a down direction on software keyboard 220.

In an embodiment, the backspace key may contain a first color for left operational movement and a second color for right operational movement.

In an embodiment, the backspace key 630, 650 preferably includes an arrow label displayed thereon as surface indicia wherein the arrow label is toggled between the first and second directions when the last character before the cursor is determined to be a LTR character and a RTL character, respectively.

In an embodiment, the first direction points to a left direction on the software keyboard, and the second direction points to a right direction on the software keyboard.

In an embodiment, the backspace key orientation is automatically toggled between axially opposed directions when the cursor position is toggled immediately after a LTR character and a RTL character, respectively.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A method for providing a text flow sensitive backspace key for bi-directional content, the method executing on at least one processor of a computing device, comprising the steps of:
   detecting placement of a cursor at an edge of bi-directional content between a left-to-right (LTR) character and a right-to-left (LTR) character displayed on a screen of an application executing on a computing device;
   identifying which of the LTR and RTL characters is a last-typed character;
   based on the identification, automatically orienting a visual indicia indicating a direction in which operation of a backspace key comprised in a keyboard deletes a character in the bi-directional content;
wherein said keyboard is one of: a hardware keyboard coupled to the computing device; and a software keyboard displayed on the screen of the application executing on the computing device.

2. The method of claim 1, wherein the visual indicia indicating a direction of operation of the backspace key points in a left direction on said keyboard if the identified last-typed character is a LTR character and points in a right direction on said keyboard if the identified last-typed character is a RTL character.

3. The method of claim 1, wherein said RTL character and said LTR character are displayed in different languages.

4. The method of claim 1, wherein said backspace key comprises an arrow label displayed thereon, and said arrow label points to the left when said last-typed character is a LTR character, and points to the right when said last-typed character is a RTL character.

5. The method of claim 1, wherein a direction indicated by the indicia is automatically toggled between opposite directions when said cursor is moved between positions in the bi-directional content at which a last-typed character adjacent the cursor is a LTR character and a position in the bi-directional content at which a last-typed character adjacent the cursor is a RTL character.

6. The method of claim 1, wherein the computing device is a mobile telephone comprising:
an edit control; and
a memory communicatively coupled to said edit control;
wherein a character order of said bi-directional content is stored in said memory and managed by said edit control such that said identifying step (b) is performed by said edit control.

7. A computer having control logic stored therein for causing the computer to provide a text flow sensitive backspace key for bi-directional content, said control logic comprising:
first computer readable program code means for causing the computer to detect placement of a cursor at an edge of bi-directional content between a left-to-right (LTR) character and a right-to-left (LTR) character displayed on a screen of an application executing on the computer;
second computer readable program code means for causing the computer to identify which of the LTR and RTL characters is a last-typed character;
third computer readable program code means for causing the computer to, when said last-typed character is a LTR character, orient said backspace key in a first direction on a keyboard; and
fourth computer readable program code means for causing the computer to, when said last-typed character is a RTL character, orient said backspace key in a second direction on said keyboard.

8. The computer of claim 7, wherein said first direction points to a left direction on said keyboard and said second direction points to a right direction on said keyboard.

9. The computer of claim 7, wherein said first is axially opposed to said second direction on said keyboard.

10. The computer of claim 7, wherein said RTL character and said LTR character are displayed in different languages.

11. The computer of claim 7, wherein said backspace key comprises an arrow label displayed thereon, said arrow label being toggled between said first direction when said last-typed character is a LTR character, and said second direction when said last-typed character is a RTL character.

12. The computer of claim 7, wherein an orientation of said backspace key is automatically toggled between opposite directions when said cursor is moved between positions in the bi-directional content at which a last-typed character adjacent the cursor is a LTR character and a position in the bi-directional content at which a last-typed character adjacent the cursor is a RTL character.

13. The computer of claim 7, wherein the computer is a mobile telephone comprising:
an edit control; and
a memory communicatively coupled to said edit control;
wherein a character order of said bi-directional content is stored in said memory and managed by said edit control such that said second computer readable program code means is performed by said edit control.

14. A computer system for providing a text sensitive backspace key for bi-directional content, comprising:
means for detecting placement of a cursor at an edge of bi-directional content between a left-to-right (LTR) character and a right-to-left (LTR) character displayed on a screen of an application executing on the computing device;
means for identifying which of the LTR and RTL characters is a last-typed character;
means for orienting said backspace key in a first direction on a keyboard, when said last-typed character is a LTR character; and
means for orienting said backspace key in a second direction on said keyboard, when said last-typed character is a RTL character.

15. The computer system of claim 14, wherein said first direction points to a left direction on said keyboard, and said second direction points to a right direction on said keyboard.

16. The computer system of claim 14, wherein said first direction is axially opposed to said second direction on said keyboard.

17. The computer system of claim 14, wherein said backspace key comprises an arrow label displayed thereon, said arrow label being toggled between said first direction when said last-typed character is a LTR character, and said second direction when said last-typed character is a RTL character.

18. The computer system of claim 14, wherein said orientation of said backspace key is automatically toggled between opposite directions when the last-typed character adjacent said cursor position changes from one to the other of a LTR character and a RTL character.

19. The computer system of claim 14, wherein the computing device is a mobile telephone comprising:
an edit control; and
a memory communicatively coupled to said edit control;
wherein a character order of said bi-directional content is stored in said memory and managed by said edit control such that said means for identifying is performed by said edit control.

* * * * *